United States Patent [19]

Buchert et al.

[11] Patent Number: 5,112,901
[45] Date of Patent: May 12, 1992

[54] SEALING ELEMENTS AND PLAIN BEARINGS FORMED FROM FIBER-REINFORCED PLASTICS

[75] Inventors: Hermann Buchert, Bad Durkheim; Juergen Ahlers, Gross-Rohrheim; Werner Kohlhaas, Rimbach; Joerg Vogelsang, Harthausen; Manfred Neitzel, Ludwigshafen, all of Fed. Rep. of Germany

[73] Assignee: BASF Aktiengesellschaft, Ludwigshafen, Fed. Rep. of Germany

[21] Appl. No.: 522,798

[22] Filed: May 14, 1990

[30] Foreign Application Priority Data

May 18, 1989 [DE] Fed. Rep. of Germany ....... 3916137

[51] Int. Cl.⁵ .............................................. C08L 75/04
[52] U.S. Cl. .................................. 524/494; 523/222; 428/65; 428/303; 428/345; 428/363; 429/294; 429/295
[58] Field of Search ................... 524/49 L; 523/222; 428/65, 303, 36.3, 34.5, 294, 295

[56] References Cited

U.S. PATENT DOCUMENTS

| | | | |
|---|---|---|---|
| 4,061,806 | 12/1977 | Lindler et al. | 428/34.5 |
| 4,581,263 | 4/1986 | Lukkas | 428/295 |
| 4,824,898 | 4/1989 | Sukigara et al. | 524/494 |
| 4,944,975 | 7/1990 | Sheer | 428/34.5 |
| 4,961,977 | 10/1990 | Archer et al. | 523/222 |
| 4,970,261 | 11/1990 | Yu et al. | 523/222 |
| 4,975,321 | 12/1990 | Gentile et al. | 428/295 |
| 5,009,941 | 4/1991 | Pollet et al. | 428/36.3 |

Primary Examiner—Paul R. Michl
Assistant Examiner—Edward J. Cain
Attorney, Agent, or Firm—Oblon, Spivak, McClelland, Maier & Neustadt

[57] ABSTRACT

Spherically shaped sealing elements and plain bearings are formed from a high-melting polycondensation thermoplastic reinforced with tangentially oriented continuous or staple fibers.

11 Claims, No Drawings

SEALING ELEMENTS AND PLAIN BEARINGS FORMED FROM FIBER-REINFORCED PLASTICS

The present invention relates to spherically shaped sealing elements and plain bearings formed from fiber-reinforced temperature resistant thermoplastics.

Seals, piston rings and bearing shells are used in hydraulics, pneumatics, mechanical engineering (for engines and compressors), machine-making, drive systems for aircraft and many other fields. Wherever exposure to high temperatures is likely, these elements customarily consist of materials such as metals, asbestos or graphite; but plastics have also already been used, e.g. polytetrafluoroethylene (PTFE) or polyoxymethylene (POM). PTFE withstands temperatures up to 300° C. for a long time without undergoing chemical decomposition; nor is oxidative decomposition or thermal decomposition likely. However, PTFE seals are difficult to fabricate since PTFE is not thermoplastic. The specific manufacturing techniques required make PTFE components expensive. Moreover, putting PTFE components under pressure for a long time makes them deform by creeping. Creeping can be observed even at low pressures and low temperatures, e.g. at room temperature, when the time under load is long.

For this reason PTFE seals fail after some time; that is, leaks occur which reduce the reliability of the system into which the seal has been fitted and can lead to expensive breakdowns.

POM has a very low melting point at 160° C. and therefore is not sufficiently temperature resistant; nor is it sufficiently resistant to chemicals.

It is an object of the present invention to develop sealing elements and plain bearings which combine good temperature and chemical resistance with good creep resistance.

We have found that this object is achieved by the present invention by spherically shaped sealing elements and plain bearings formed from a thermoplastic polycondensate having a melting point above 180° C. which is reinforced with tangentially oriented continuous fibers or staple fibers not less than 20 mm in length.

The sealing elements and plain bearings are spherically shaped; that is, they are curved, preferably round. Seals and piston rings are in general ring-shaped, while bearing shells are properly spherical or else cylindrical.

The plastics used are thermoplastic and their melting points are above 180° C., preferably above 200° C., in particular above 250° C. The table below indicates some suitable plastics and their approximate melting points in °C.:

| Polyethylene terephthalate | (250) |
| --- | --- |
| Polybutylene terephthalate | (225) |
| Nylon-6 | (220) |
| Nylon-6.6 | (255) |
| Nylon-4.6 | (295) |
| Polycarbonate | (225) |
| Polyphenylene ether | (215) |
| Polyphenylene sulfide | (276) |
| Thermoplastic polyimide | (260) |
| Polyether imide | (215) |
| Polysulfone | (185) |
| Polyamide imide | (280) |
| Polyether sulfone | (228) |
| Polyether ketone | |
| PEK | (365) |
| PEEK | (342) |
| PEKEKK | (373) |
| PEEKK | (360) |
| PEKK | (405) |
| Liquid-crystalline polyesters | (>250) |

It is of course also possible to use the corresponding copolymers and mixtures.

Suitable reinforcing fibers are those formed from glass, carbon or aromatic polyamide. It is basically also possible to use metallic and ceramic fibers. They are either in the form of continuous fibers or else in the form of staple fibers preferably from 20 to 200 mm in length, for example in the form of Schappe yarns as defined in German Standard Specification DIN 60 900 Part 6. It is also possible to use woven, knitted or non-woven fabrics.

The weight ratio of fiber to thermoplastic can vary within wide limits within the range from 10:90 to 90:10; it is preferably within the range from 30:70 to 70:30.

Sealing elements or plain bearings may contain customary plastics additives, for example molybdenum sulfide, graphite, silicones or polytetrafluoroethylene powder, to improve the gliding effect, but also minerals, pigments, inhibitors and antioxidants.

The sealing elements and plain bearings are fabricated by bringing together plastic and fiber, melting the plastic, and at the same time shaping the mixture in the shape of final element.

The bringing together can be effected, for example, by impregnating spherical shapes, e.g. rings, made from reinforcing fibers or punched out of textile structures with the plastic in the form of a solution, a dispersion, a powder, a film or a melt. In a preferred embodiment, mixed plastic/reinforcing fibers, e.g. hybrid yarns as described in EP-A-156 599, are wound onto a core where the space between its two radial demarcations has the dimensions of the seal to be fabricated. These cores preferably consist of graphite, metal, ceramic or glass; in the case of polyether ketone/carbon fiber combinations, cores made of graphite are preferred.

After the wound structure has reached the desired diameter, it is heated together with the core to a temperature which in the case of amorphous thermoplastics is above the glass transition temperature and in the case of partly crystalline thermoplastics is above the melting point. In the course of heat treatment, the thermoplastic particles, fibers or ribbons melt and fill out the voids between the infusible fibers.

Owing to the comparatively large thermal expansion coefficient of the plastic and the relatively small thermal expansion coefficient of the metal from which the core is made, a pressure develops in the wound structure, forcing the thermoplastic material into the interstices of the fiber bundle. This pressure is opposed by the tensile strength of the fibers, so that the wound structure need not be sealed in on the outer cylindrical surface. The heat treatment can be carried out in hot liquids, gases, molten metals, suitable induction coils, etc.

The ready-produced seal is slid off the core after a flange has been removed from said core.

A sensible way of mass producing such seals would appear to be to produce a pipe by the core winding technique and then to cut off rings, for example by means of a laser.

The sealing elements and plain bearings according to the present invention are inexpensive compared to those formed from fiber-free thermoplastics, but in particular they are much less likely to creep, since the fibers of the helically wound structures strongly counteract the creep tendency of the thermoplastic held within the interstices. It is also important that the seals according to the present invention can replace the asbestos seals, which are known to represent an occupational hygiene risk.

A hybrid yarn 1 mm in diameter produced as described in EP-A-156.599 from 40% by volume of polyether ether ketone fibers and 60% by volume of carbon fibers is wound onto a graphite shaft 50 mm in diameter. To delimit the wound structure at the side, two flanges have been mounted on the shaft 9 mm apart. Separating films are placed between the wound structure and each flange. Hybrid yarn is wound onto the shaft until the wound structure has attained a thickness of 100 mm (outer diameter). The flanges are then pressed together at 420° C. and 19 bar for 1 hour to a distance between them of 7 mm. After cooling, the separating film is easy to remove. The compact sealing ring produced is removed from the shaft and machined until its dimensions are an outer diameter of 76 mm, an inner diameter of 50 mm and a width of 6.5 mm.

We claim:

1. A sealing element or plain bearing formed from a fiber-reinforced plastic, wherein the plastic is a thermoplastic polycondensate having a melting point above 180° C. and selected from the group consisting of polycarbonate, polyphenylene sulfide, polyimide, polyether imide, and polyether ketone and the reinforcing fibers are tangentially oriented continuous fibers or staple fibers not less than 20 mm in length.

2. A sealing element or plain bearing as claimed in claim 1, wherein the reinforcing fibers are glass, carbon or aramid fibers.

3. A sealing element or plain bearing as claimed in claim 1, wherein said thermoplastic polycondensate is a polyether ketone.

4. A sealing element or plain bearing as claimed in claim 3, wherein said polyether ketone is selected from the group consisting of PEK, PEEK, PEKEKK, PEEKK and PEKK.

5. A sealing element or plain bearing as claimed in claim 1, wherein said polycondensate has a melting point above 200° C.

6. A sealing element or plain bearing as claimed in claim 1, wherein said polycondensate has a melting point above 250° C.

7. A sealing element or plain bearing as claimed in claim 1, wherein the weight ratio of said fiber to said thermoplastic polycondensate is within the range from 10:90 to 90:10.

8. A sealing element or plain bearing as claimed in claim 1, wherein the weight ratio of said fiber to said thermoplastic polycondensate is within the range from 30:70 to 70:30.

9. A sealing element or plain bearing as claimed in claim 1, wherein said fiber is a staple fiber having a length of 20-200 mm.

10. A spherically shaped sealing element or plain bearing formed from a fiber-reinforced plastic, wherein said plastic is a polyether ketone having a melting point above 180° C. and the reinforcing fibers are tangentially oriented continuous fibers or staple fibers not less than 20 mm in length.

11. The sealing element or plain bearing as claimed in claim 1, wherein said sealing element or plain bearing is spherically shaped, ring shaped or cylindrically shaped.

* * * * *